May 11, 1948. F. C. DE REAMER ET AL 2,441,399
INCANDESCENT AND FLUORESCENT LAMP HOLDER
Filed Jan. 16, 1946
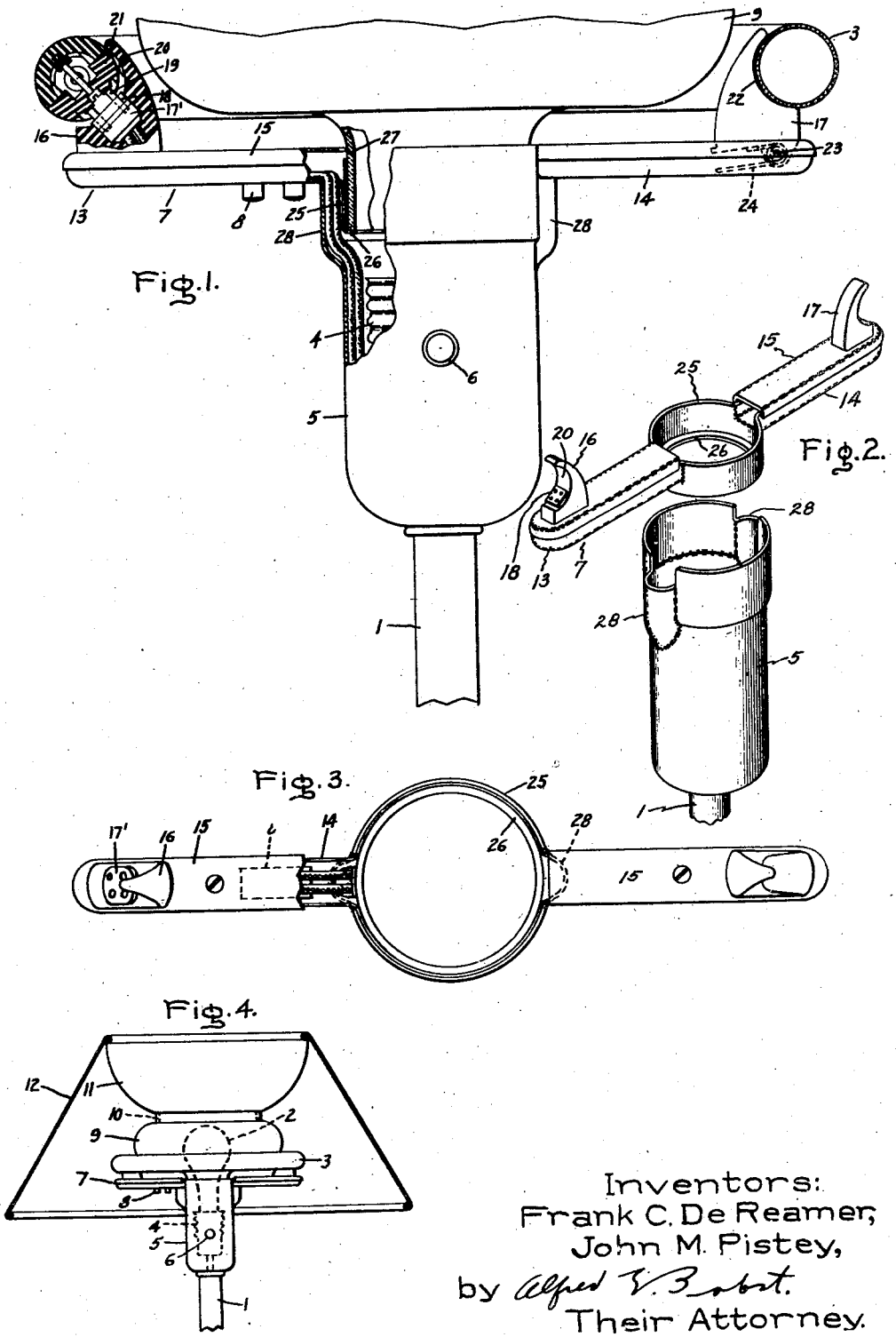
Inventors:
Frank C. De Reamer,
John M. Pistey,
by Alfred V. Bobst.
Their Attorney.

Patented May 11, 1948

2,441,399

UNITED STATES PATENT OFFICE 2,441,399

INCANDESCENT AND FLUORESCENT LAMP HOLDER

Frank C. De Reamer, Lake Worth, Fla., and John M. Pistey, Fairfield, Conn., assignors to General Electric Company, a corporation of New York Application January 16, 1946, Serial No. 641,430

4 Claims. (Cl. 240—51.12)

Our invention relates to a lamp holder for circular lamps of the tubular gaseous discharge type, such as circular fluorescent lamps of the type now on the market, and more particularly to lamp holders designed for use with a lamp fixture using both a standard incandescent lamp and the new circular fluorescent lamps.

It is an object of our invention to provide a new and improved lamp fixture having holders so arranged together as to support an incandescent lamp and a circular fluorescent lamp.

It is another object of our invention to provide a lamp holder which is particularly well suited for use in a floor or table lamp wherein an incandescent lamp is used to obtain indirect lighting and a circular fluorescent lamp used for reading.

It is a further object of our invention to provide a lamp holder for circular fluorescent lamps which can be used with certain existing incandescent lamp fixtures to convert them for use with circular fluorescent lamps with little if any change in the lamp fixture.

In the accompanying drawing, Fig. 1 is a view, partly in section, of a lamp holder constructed in accordance with our invention with a circular fluorescent lamp mounted thereon; Fig. 2 is an exploded view of the lamp holder and a lamp husk in which it is to be mounted; Fig. 3 is a top view of the lamp holder, and Fig. 4 is a view of a table lamp, or the like, equipped with both an incandescent lamp and a circular fluorescent lamp together with holders for mounting the lamps.

Referring to Fig. 4 of the drawing, we have shown the upper portion of a floor or table lamp having a column support I provided with an incandescent lamp 2 and a circular discharge lamp, such as a fluorescent lamp 3. The incandescent lamp is mounted in a socket 4 carried by the husk 5 supported on the lamp column I. It is operated by any conventional form of switch 6. The circular fluorescent lamp is mounted in a lamp holder 7 which, in turn, rests on and is supported by the husk 5. It is operated by a push button switch 8 of a conventional style now on the market.

The lamp is provided with a globe 9, of any suitable translucent material such as glass or a plastic, which is mounted on husk 5 in a manner to be described later. It surrounds the incandescent lamp 2 and nests within the circular fluorescent lamp 3. At its upper portion, the globe 9 is formed with a collar 10 to form a guide means for the indirect globe 11 which rests on the globe 9. The globe 11 is made of any suitable translucent material. It carries a shade 12 which extends downwardly to partially enclose both the incandescent and fluorescent lamps.

A lamp fixture thus constructed is particularly well suited for giving both indirect light for general illumination and direct light for reading. Indirect light is thrown to the ceiling of a room by the incandescent lamp 2 and the partially reflecting globes 9 and 11. For reading, the circular fluorescent lamp may be used alone. The circular fluorescent lamp and its holder are compact in arrangement and are well suited for incorporation in floor or table lamps of the type now on the market. Our lamp holder for the circular fluoerscent lamp is one which may be used with existing fixtures for incandescent lamps without any substantial modification of the fixture.

Turning now to the construction of the lamp holder and referring to Fig. 1, the holder includes a bracket 13 extending across the loop of the lamp. It is constructed of an elongated channel-shaped member 14 together with two cover members 15 which rest on the lower channel to form a runway for electrical conductors leading to the circular lamp. Opposite ends of the bracket carry laterally extending arms 16 and 17 which engage the periphery of the circular lamp to hold it in position. The arms are made of any suitable insulating material such as a molded plastic. Arm 16 is fixed to the bracket 13 and carries a molded-in connector 17' provided with contact receptacles 18 for receiving the four contact pins 19 of the circular fluorescent lamp. The connector rests in and forms part of a curved surface 20 of the arm which extends around and engages the lamp base 21. Manifestly, if desired, the contact receptacles 18 may be molded directly in arm 16. Arm 17 is likewise formed with a curved surface 22 so that it fits around and engages the glass wall of the lamp. The arm is pivoted on the bracket by means of a pin 23 and a spring 24 biases the arm into engagement with the lamp. The action of the spring biased arm 17 tends to hold the lamp base in engagement with the connector on the holder. The holder for circular lamps thus far described is substantially the same as that described in a copending application of Frederick C. Dazley, Serial No. 624,036, filed October 23, 1945, for Lamp holder for circular lamps, and assigned to the same assignee as the instant application. Our invention is in the nature of an improvement in the lamp holder described in that application, the improved construction being such that the holder may be incorporated into a floor lamp, or the like, to give a new and improved lamp fixture using both incandescent and fluorescent light.

To this end we form the lower channel member 14 of the bracket with a centrally located annular cup portion 25 having an inwardly turned flange 26 at its lower end. The cup extends laterally from the bracket on the side opposite the arms 16 and 17. As shown in Fig. 1, the cup or ring-like portion 25 is of a diameter such that it fits within the husk 5 with the flat portions of the channel member 14 resting on the edge of the husk to support the holder 7 in position. Moreover, the cup portion 25 is of a diameter such that an incandescent lamp may extend downwardly through it with proper clearance when the lamp is mounted in socket 4. The flange 26 supports the globe 9 by means of a neck portion 27 forming part of the globe and which rests on the flange. The neck portion is likewise of a diameter such that an incandescent lamp may extend through it. This arrangement is shown by Fig. 4.

In order to accommodate the four electric conductors connected to the fluorescent lamp, the husk is provided with diametrically opposite slots or extensions 28 which extend downwardly along the outer wall of the husk for a distance such that the wires clear the cup 25 of lamp holder 7. The conductors then extend downwardly through the husk alongside the socket 4 to the ballast or transformer in the base of the lamp fixture. The switch 8, which may be of a push button type now available on the market, is mounted in the runway in the bracket 13. In this position, it is easily accessible for operation and takes up no additional space in the lamp fixture.

Our lamp holder is one which may be used with existing lamp fixture without any appreciable structural modification of the fixtures. The arrangement of the incandescent lamp 2, socket 4, husk 5 and operating switch 6 is a standard one. To use a circular fluorescent lamp in a lamp fixture of this type, it is only necessary to mount the circular lamp holder 7 on the husk and provide the husk with the easily formed extensions 28 to accommodate the connecting conductors. No rearrangement of the parts is necessary. While for the purposes of illustration, we have shown the two globes 9 and 11 carried by the holder 7, it should be manifest that any desired type of globe may be used with the lamp fixture. The incandescent lamp is centrally located in the lamp fixture and is supported in a position to give a good indirect light. The circular fluorescent lamp is held in a position such that it surrounds the incandescent lamp and is available for reading or general lighting. This gives a compact and pleasing arrangement of the two light sources.

What we claim as new and desire to secure by Letters Patent of the United States is:

1. A lamp holder for a tubular lamp formed as a loop and having a contact base in its periphery comprising, in combination, an elongated supporting bracket adapted to extend across the loop of the lamp, an arm extending laterally from said bracket and being provided with a receptacle for engaging the contact base of the lamp for making an electrical connection therewith, a second arm movably mounted on said bracket for engaging and supporting the periphery of the lamp at a point spaced from said contact base, said bracket being provided with a circular portion between said arms for mounting the bracket on a lamp fixture and for receiving a lamp bulb therein.

2. A lamp holder for a circular lamp comprising, in combination, an elongated bracket adapted to extend across the loop of the lamp, an arm carried by said bracket provided with a receptacle for making an electrical connection with the lamp, a second arm movably mounted on said bracket, and spring means biasing said second arm into engagement with the periphery of the lamp, said bracket being provided with an annular cup portion between said arms to provide a space for an incandescent lamp bulb to be nested therein.

3. A lamp holder for a circular lamp comprising, in combination, an elongated bracket adapted to be located in the loop of the lamp, spaced arms carried by said bracket, one of said arms being provided with a receptacle for making electrical connection with the lamp, one of said arms being pivotally mounted on said bracket, and spring means biasing said pivoted arm into engagement with the wall of the lamp, said bracket being provided with a laterally extending cup-shaped portion having an opening therein to provide a space for an incandescent lamp bulb to be nested therein.

4. A lighting fixture comprising, in combination, a fixture husk, a socket mounted in said husk for supporting a lamp bulb, an elongated bracket provided with a cup-shaped portion mounted in said husk around said socket, an arm mounted on one end of said bracket provided with a receptacle for making an electrical connection with the base of a circular tubular lamp, a second arm movably mounted on the other end of said bracket and spring means biasing said second arm into engagement with the tubular periphery of the lamp.

FRANK C. DE REAMER.
JOHN M. PISTEY.

REFERENCES CITED

The following references are of record in the file of this patent:

UNITED STATES PATENTS

| Number | Name | Date |
| --- | --- | --- |
| 124,076 | Levy | Dec. 17, 1940 |
| 2,350,462 | Johns | June 6, 1944 |